United States Patent

Lougheed

[15] 3,673,391

[45] June 27, 1972

[54] DIGITAL FREQUENCY MULTIPLYING SYSTEM

[72] Inventor: James H. Lougheed, Ottawa, Ontario, Canada

[73] Assignee: Northern Electric Company Limited, Montreal, Quebec, Canada

[22] Filed: Dec. 16, 1970

[21] Appl. No.: 98,505

[52] U.S. Cl. ....................235/150.3, 235/92 DM, 324/78 D, 324/79 D, 328/38

[51] Int. Cl. .......................................H03k 5/00, G01r 23/02

[58] Field of Search ....................235/150.3, 150.31, 92 DM; 307/220–222, 225; 328/38–41, 48, 55; 324/78 D, 79 D

[56] References Cited

UNITED STATES PATENTS

| | | | |
|---|---|---|---|
| 3,537,003 | 10/1970 | Planta et al. | 324/78 D X |
| 3,412,329 | 11/1968 | Granqvist | 324/79 D |
| 3,430,201 | 2/1969 | Kintner | 235/92 DM |
| 3,504,290 | 3/1970 | Earle | 328/41 X |
| 3,510,633 | 5/1970 | Kintner | 235/150.3 X |
| 3,553,728 | 1/1971 | Frank et al. | 324/78 D |

*Primary Examiner*—Eugene G. Botz
*Assistant Examiner*—Jerry Smith
*Attorney*—John E. Mowle

[57] ABSTRACT

A frequency multiplier in which an output pulse train is obtained, at a frequency related to the frequency of a sequence of input pulses. A counter is connected to a fixed oscillator and an output pulse generated each time the count reaches the same number as that stored in a separate up-down counter. The output frequency is controlled by varying the number stored in the up-down counter. This control is obtained by applying the output pulse train to a dividing circuit, which sets the overall multiplying factor of the system, and comparing the time of occurrence of the output pulses from the dividing circuit and the input pulses to the system to provide an appropriate change in the number stored in the up-down counter.

7 Claims, 5 Drawing Figures

INVENTOR
James H. Loughead
BY Weir, Marshall, MacRae & Lamb
PATENT AGENT

DIGITAL FREQUENCY MULTIPLYING SYSTEM

BACKGROUND OF THE INVENTION

This invention relates to a frequency multiplying system operating in a digital mode. The system of this invention is particularly useful at low frequencies.

Known frequency multiplying systems include non-linear circuits which generate harmonics, the higher orders of which may be selected by filtering to provide the required higher output frequency. The power available at this higher frequency is extremely limited. Parametric frequency multipliers may also be used but, due to device characteristics, are restricted to high frequency operation.

SUMMARY OF THE INVENTION

The digital frequency multiplying system of this invention includes an oscillator whose output pulses are counted by a first counter. Both the first counter and an up-down counter are connected to a comparator which indicates coincidence between the numbers appearing in the counters and each time coincidence is achieved a system output pulse is generated. The output frequency is controlled by varying the number stored in the up-down counter. The output pulse train is connected to a second counter which determines the multiplication ratio of the system. A sequency detector is responsive to the input pulse train and the output of the second counter and connected to control the number stored in the up-down counter so that the input pulse train and the output pulses from the second counter coincide.

This system is operable over a wide range of frequencies of the input pulse train and, in particular, is operable at low values of frequency. The multiplication ratio is a function of the connection between the digital circuits used and is, thus, not dependent on the tolerances of various components. The output pulse train is accurately related in phase to the input pulse train.

DESCRIPTION OF THE PREFERRED EMBODIMENT

Figure 1:
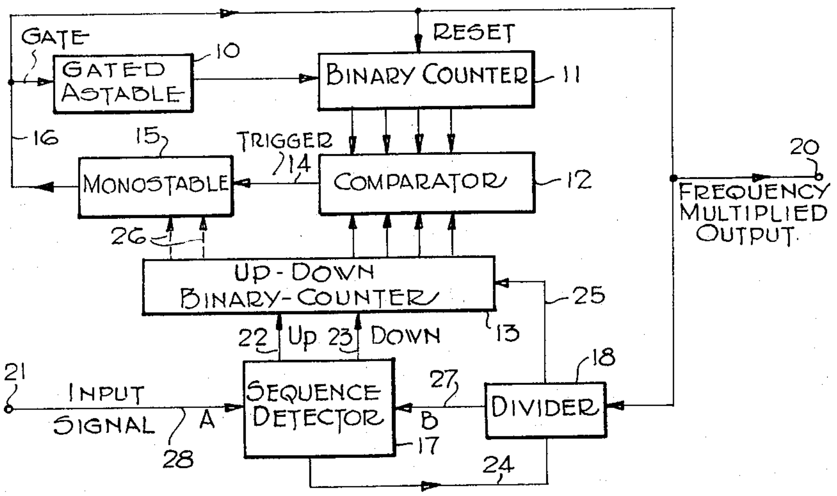
FIG. 1 is a schematic diagram of one embodiment of the system of this invention.

Referring to FIG. 1 an oscillator circuit 10 has its output connected to a binary counter 11. A comparator 12 is provided connected both to the binary counter 11 and an up-down binary counter 13 so that when there is a coincidence in the number appearing in counter 11 and up-down counter 13 the comparator produces an output pulse on lead 14. Lead 14 is connected to a monostable circuit 15 the output pulse from which constitutes the output of the system. This pulse is connected to output terminal 20 via lead 16 and is also connected to oscillator 10 and binary counter 11 to inhibit operation of the oscillator and reset the binary divider.

It will be apparent that the system so far described functions to produce a train of output pulses at a lower frequency than the signal from oscillator 10. The frequency of this train of output pulses is determined by the number stored in the up-down counter 13. Although it is useful in a practical system to employ monostable circuit 15 it is not essential to the operation of the system of this invention since the direct output pulse appearing on comparator lead 14 could be used to reset counter 11. For similar reasons, while it is desirable to gate off the oscillator 10 during the occurrence of the reset pulse an operable system with only slightly reduced accuracy can be produced without using this feature.

In order to control the frequency of the output pulse train a mechanism is provided for altering the number stored in up-down counter 13. This mechanism consists of a sequence detector 17 and a further counter 18 functioning as a divider. Divider 18 is connected to the output pulse train and divides it by a factor equal to the multiplication ratio desired for the overall system. Both the output pulse from divider 18 and the input sequence of pulses, applied at terminal 21, are supplied to sequence detector 17 which determines their relative times of occurrence. If the pulse from divider 18 occurs before its corresponding input signal pulse at terminal 21 then it is apparent that the frequency of the output pulse train at terminal 20 is too high. Accordingly, it is necessary that the number stored in the up-down counter 13 be increased. Similarly, if the output pulse from divider 18 lags the corresponding pulse applied to input terminal 21 then the output at terminal 20 is occurring at too low a frequency and, to increase this frequency, the number stored in the up-down counter 13 must be decreased.

In the system shown in FIG. 1 the signals from sequence detector 17 determine only in which direction the number stored in up-down counter 13 should be changed. The pulse sequence to be counted by this counter is obtained from one of the stages of divider 18 via lead 25. If a significant amount of correction is expected then relatively high frequency signals will be chosen from divider 18 by connecting lead 25 to an earlier stage and if only minor corrections are expected to be necessary then relatively low frequency signals will be chosen from divider 18 by connecting lead 25 to one of the later stages. The use of the terms "high frequency signals" and "low frequency signals" in the last sentence is to be interpreted only with relation to the signal at terminal 20 being termed "high" and the signal at terminal 21 being termed "low".

Instead of the signals to be counted by up-down counter 13 being supplied from a selected stage of divider 18 they may be derived from a fixed frequency external source. The former method of connection causes the system to approach the correct multiplication ratio exponentially whereas the latter causes the system to approach the correct ratio linearly. If the input on lead 25 is interrupted the output frequency is held constant. Desirably, the system is controlled so that if there is a loss of input signal lead 25 is opened to hold the output signal at the last known frequency.

Describing the operation of sequence detector 17 in greater detail, either the UP line 22 or the DOWN line 23 will be enabled depending on whether the output pulse from counter 18 leads or lags, respectively, the arrival of the input pulse at terminal 21. When pulses have appeared on both inputs to sequence detector 17 then both UP line 22 and DOWN line 23 are inhibited and a reset pulse produced on line 24 to reset divider 18. The clock pulse, or counting, input supplied to up-down counter 13 by lead 25 determines the rate of change of the count in the counter during the interval between the occurrence of either an UP or DOWN pulse and the clearing of divider 18.

Figure 2:
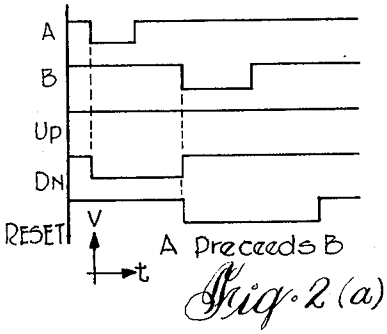
FIG. 2 is a diagram of various waveforms occurring in the operation of the system shown in FIG. 1.
Figure 2:
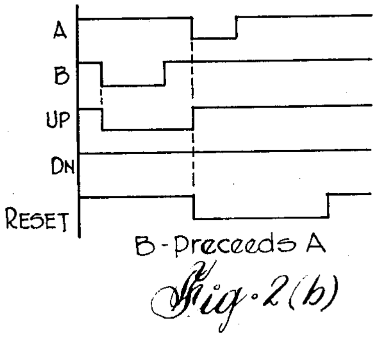
Figure 2:
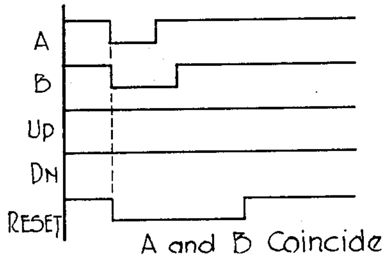

Typical waveforms occurring during operation of the sequence detector are shown in FIGS. 2(a), (b) and (c). These waveforms are applicable to logic systems using DTL. As will be apparent to those skilled in the art, the multiplying system of this invention can be implemented by means of different relative polarities defining ONE and ZERO and by using different logic systems. The leading edge of the first pulse to arrive on one of leads 27 and 28 enables the corresponding UP or DOWN line, 22 or 23. The subsequent arrival of the pulse on the other line terminates this command signal. The reset signal on line 24 is generated when pulses have appeared on both lines 27 and 28. The three different situations in possible timing of the signals to the sequence detector are shown in FIGS. 2(a), (b) and (c).

Figure 3:
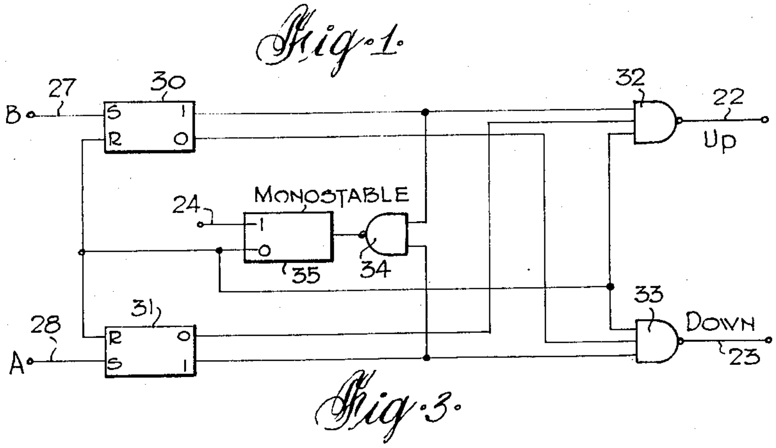
FIG. 3 is a schematic diagram of a sequence detector useful in the system of FIG. 1.

FIG. 3 shows, in schematic form, the connection diagram of one form of a sequence detector suitable for use in the system of this invention. Lead 27 is connected to the SET input of a flip-flop 30 and lead 28 is connected to the SET input of a flip-flop 31. The ONE output of each flip-flop is connected to an input of corresponding AND gates 32 and 33 respectively. The output of these AND gates provides the necessary control signals for the up-down counter, the count-up command appearing on lead 22 and the count-down command appearing on lead 23. Further inputs to AND gates 32 and 33 are provided from the ZERO output of flip-flops 31 and 30, respectively. An additional AND gate 34 is provided having two inputs, one connected to each of the ONE outputs of flip-flops 30 and 31. The output of AND gate 34 is connected to the trigger input of a monostable circuit 35, the ONE output of which provides the reset signal on lead 24. The ZERO output of monostable circuit 35 is connected to the third input of each of gates 32 and 33 and is also connected to the reset terminals of flip-flops 30 and 31.

In operation of the sequence detector shown in FIG. 3, if the pulse on lead 28 arrives before the pulse on lead 27 it sets flip-flop 31 which in turn enables the corresponding input to gate 33. The other two inputs to the gate are high at this time and hence, gate 33 is enabled providing a signal on lead 23 to control the up-down counter for downward counting. This condition continues until the corresponding pulse from divider 18 arrives on lead 27 setting flip-flop 30 and hence, closing gate 33. When both flip-flops 30 and 31 have been set gate 34 is enabled, triggering monostable 35 and producing a reset pulse. The pulse appearing on lead 24 is connected to reset divider 18 and the change in level of the ZERO output is connected to flip-flops 30 and 31 to reset them and also connected to gates 32 and 33 to avoid any spurious output pulses during the reset operation.

A further feature of the disclosed system is that the phase of the output pulse train appearing at terminal 20 can be controlled by varying the length of the reset pulse produced by monostable circuit 15. Clearly, a longer duration reset pulse appearing on lead 16 will slightly delay the restart of oscillator 10 and hence delay the pulse appearing at terminal 20. This provides a fine control of the phase relationship between the output signal at terminal 20 and the input signal at terminal 21 and hence, a fine control of the frequency of the output pulse train. Leads 26 connected between up-down counter 13 and monostable 15 are to provide this control in accordance with the least significant bits stored in up-down counter 13. Specifically, the charging current supplies to the timing capacitor of a conventional collector-coupled monostable circuit is obtained from binary-weighted current sources each connected to corresponding stages in up-down counter 13. Thus, the pulse width is proportional to the number stored in some (typically four) of the least significant bits of up-down counter 13.

Thus, there has been described one embodiment of the frequency multiplying system of this invention. In a typical application an input pulse train having a frequency in the range 1–2 Hertz is multiplied by a factor of 3,600 with an accuracy of about 0.03 percent. Should an output be desired which is not in pulse form, the signal at terminal 20 can be supplied to a flip-flop circuit providing a square wave output at half the frequency of the pulse signal from terminal 20.

A particular model of the frequency multiplying system of FIG. 1 has been constructed and tested. Oscillator 10 was operated at a frequency of 1.75 MHz. Counter 11 was a nine bit binary counter and up-down counter 13 was a 13 bit binary counter with the four least significant stages connected to current sources to control the reset pulse length from monostable 15 and the remaining stages connected to comparator 12. Divider 18 had a total count of 3,600 provided by four decade stages.

This model was tested and provided a multiplier ration between 3,600.1 and 3,600.9 for input frequencies in the range 1 to 2 Hz. The multiplier resolution, which is dependent on the increments of variation in the length of the pulse from monostable 15, was thus 0.8 in 3,600. Since the frequency of oscillator 10 is 1.75 MHz and 16 monostable increments sum to the oscillator period it will be seen that each increment was about 35 ns.

I claim:

1. A digital frequency multiplier responsive to an input pulse train to produce an output pulse train at a higher frequency comprising:
   - an oscillator,
   - a first counter connected to said oscillator,
   - a digital store,
   - a comparator circuit connected to said first counter and said digital store to produce a signal indicative of coincidence between the number in said digital store and the count in said first counter, the succession of such signals being the output pulse train,
   - a further connection between said comparator circuit and said first counter to reset the counter on occurrence of said signal,
   - a second counter connected to receive said output pulse train,
   - a sequence detector, connected to said input pulse train and to the output of said second counter, producing control signals indicative of coincidence or absence thereof between the input pulse train and the output of said second counter,
   - means coupling said control signals to said digital store to increase the number stored therein if the output of the second counter occurs before the corresponding pulse of the input pulse train and to decrease the number stored therein if the output of the second counter occurs after the corresponding pulse of the input pulse train and
   - means connecting said sequence detector and said second counter to reset the second counter on the occurrence of both inputs to said sequence detector.
2. A digital frequency multiplier as set out in claim 1 wherein said digital store is a binary counter.
3. A digital frequency multiplier as set out in claim 2 wherein said digital store is an up-down binary counter connected to receive input pulses from one stage of said second counter and said control signals determine the direction of counting.
4. A digital frequency multiplier as set out in claim 3 wherein said first counter is a binary counter.
5. A digital frequency multiplier as set out in claim 1 further comprising a monostable circuit connected to the output of said comparator to shape the output pulse train.
6. A digital frequency multiplier as set out in claim 5 wherein the digital store is connected to said monostable circuit to control the pulse width of the output pulse train and provide increased resolution of the system.
7. A digital frequency multiplier as set out in claim 1 wherein said oscillator is a gated oscillator connected to said comparator circuit to inhibit oscillation during the occurrence of comparator output signals.

* * * * *